US012803628B2

(12) United States Patent
Mansour et al.

(10) Patent No.: US 12,803,628 B2
(45) Date of Patent: Nov. 17, 2026

(54) DYNAMIC ATMOSPHERIC DUCTING MITIGATION WITH DYNAMIC ANTENNA SWITCHING

(71) Applicant: T-MOBILE INNOVATIONS LLC, Overland Park, KS (US)

(72) Inventors: Nagi A. Mansour, Arlington, VA (US); Daniel Stewart Broyles, Spring Hill, KS (US); Akin Ozozlu, McLean, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 353 days.

(21) Appl. No.: 18/409,440

(22) Filed: Jan. 10, 2024

(65) Prior Publication Data

US 2025/0226860 A1 Jul. 10, 2025

(51) Int. Cl.
*H04B 7/06* (2006.01)
*H04B 7/026* (2017.01)
*H04W 28/02* (2009.01)

(52) U.S. Cl.
CPC ........... *H04B 7/0608* (2013.01); *H04B 7/026* (2013.01); *H04W 28/0236* (2013.01)

(58) Field of Classification Search
CPC ... H04B 7/0608; H04B 7/026; H04B 28/0236
See application file for complete search history.

(56) References Cited

U.S. PATENT DOCUMENTS 6,477,376 B1 * 11/2002 Carter .................... H04W 16/18
455/67.11
8,654,815 B1 * 2/2014 Forenza ............... H04B 7/0684
375/267
9,693,271 B2 * 6/2017 Koc ..................... H04W 36/324
9,949,279 B2 * 4/2018 Simonsson ........... H04W 24/10
10,117,248 B1 * 10/2018 Wurtenberger ...... H04J 11/0056
11,540,232 B1 * 12/2022 Marupaduga ......... H04W 72/54
12,231,211 B2 * 2/2025 Chukka .................. H04B 7/086
12,362,818 B2 * 7/2025 Upadhya ............ H04B 7/15507
2002/0002052 A1 * 1/2002 McHenry .............. H04W 72/54
455/446

(Continued)

FOREIGN PATENT DOCUMENTS

CA 2673362 A1 * 6/2008 ............... H04B 7/02
WO WO-2024208405 A1 * 10/2024 ......... H04B 7/06952

*Primary Examiner* — Eunsook Choi
(74) *Attorney, Agent, or Firm* — SHOOK, HARDY & BACON L.L.P.

(57) ABSTRACT

Systems and methods are provided to optimize antenna utilization for downlink signal transmission in wireless networks. The system includes a first antenna at a standard height for regular atmospheric conditions and a second antenna at a different elevation, activated in response to detected atmospheric ducting conditions. The method involves transmitting a downlink signal using the first antenna, monitoring for atmospheric conditions and signal degradation, and switching to the second antenna upon detecting ducting. A dynamic control unit oversees the transition between antennas, ensuring signal integrity and mitigating interference. This adaptive approach enhances network reliability and service quality by addressing the challenges posed by atmospheric variability, thereby improving the user experience in wireless communication networks.

19 Claims, 4 Drawing Sheets

(56) References Cited

U.S. PATENT DOCUMENTS

| | | | | |
|---|---|---|---|---|
| 2008/0194265 | A1* | 8/2008 | Engstrom | H04W 16/18 455/446 |
| 2010/0304680 | A1* | 12/2010 | Kuffner | H04B 7/10 455/77 |
| 2011/0002411 | A1* | 1/2011 | Forenza | H04L 25/03343 375/267 |
| 2013/0337844 | A1* | 12/2013 | Meredith | H04W 64/00 455/456.5 |
| 2015/0326463 | A1* | 11/2015 | Solondz | H04L 43/0829 370/252 |
| 2017/0054482 | A1* | 2/2017 | Forenza | H04B 7/0626 |
| 2022/0158700 | A1* | 5/2022 | Forenza | H04B 7/0626 |
| 2023/0337083 | A1* | 10/2023 | Song | H04W 36/30 |
| 2023/0403073 | A1* | 12/2023 | Lagrotta | H04B 7/22 |

* cited by examiner

DYNAMIC ATMOSPHERIC DUCTING MITIGATION WITH DYNAMIC ANTENNA SWITCHING

SUMMARY

The present invention relates to wireless telecommunications with antennas and radio frequency (RF) signal interference.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
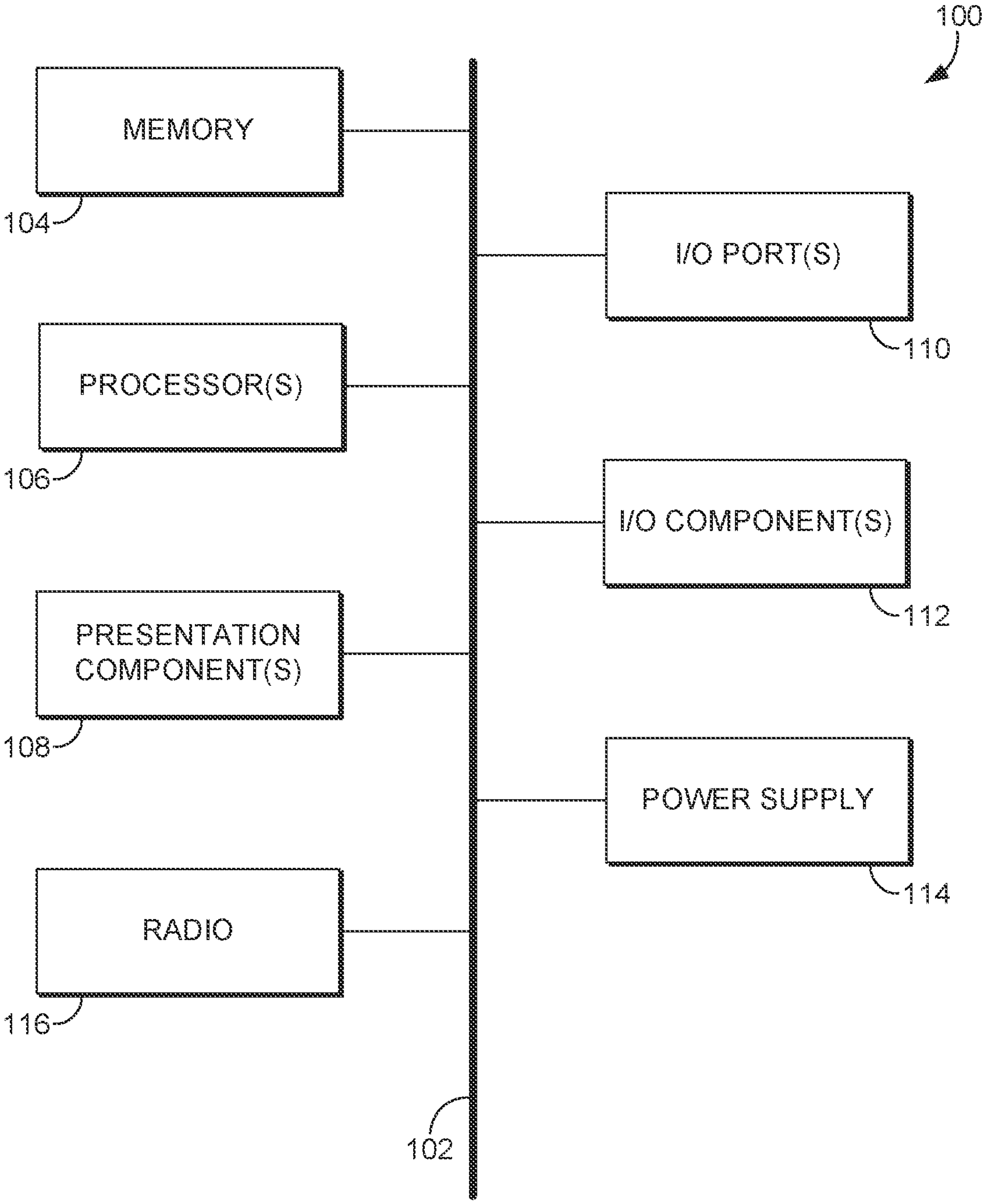
FIG. 1 illustrates an exemplary computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like. The term "node" is used to refer to an access point that transmits signals to a UE and receives signals from the UE in order to allow the UE to connect to a broader data or cellular network (including by way of one or more intermediary networks, gateways, or the like)

Embodiments of the technology described herein may be embodied as, among other things, a method, system, or computer-program product. Accordingly, the embodiments may take the form of a hardware-based embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, atmospheric ducting, a phenomenon impacting radio wave propagation, occurs with higher occurrence near bodies of water and in hot environments. These areas are prone to the formation of distinct atmospheric layers due to their unique thermal conditions and proximity to water sources. Ducting arises when these layers, characterized by varying refractive indices, create a channel-like effect that traps radio waves. This trapping effect can cause the signal from a transmitting (Tx) antenna of a tower to overshoot its intended receiving (Rx) antenna, resulting in communication gaps and signal degradation.

This phenomenon is particularly pronounced during certain times of the day, such as early mornings or late evenings, when temperature inversions are common. Temperature inversion occurs when a layer of warm air overlies a layer of cooler air near the ground, reversing the typical temperature gradient of the atmosphere. This inversion plays a pivotal role in the formation of ducting layers, as it leads to variations in the density and refractivity of the air, creating conditions conducive for ducting.

In coastal areas or near large bodies of water, the effect of ducting is often magnified. Bodies of water tend to moderate air temperature, leading to more pronounced temperature gradients between land and sea. These gradients contribute to the creation of stable atmospheric layers that facilitate ducting. Additionally, in arid or desert regions, the extreme daytime heat and rapid nighttime cooling create conditions that are ideal for the formation of ducting layers.

In the realm of wireless communications, maintaining a robust and reliable connection between base stations and user equipment (UE) is paramount. The efficiency of this connection is often challenged by various environmental factors, one of which is atmospheric ducting. Atmospheric ducting is a phenomenon that can significantly alter the path of radio waves, causing them to travel over longer distances than intended. This condition primarily arises due to temperature inversions, as mentioned above, where a layer of cooler air is trapped near the ground by a warmer air mass above it. While this can sometimes be beneficial for extending the range of signals, it more often results in unwanted interference and signal degradation, particularly in areas beyond the intended coverage zone.

Current technologies employ fixed antenna systems that are optimized for standard atmospheric conditions. These antennas are designed to provide consistent coverage and signal quality under normal weather patterns. However, these systems are not always capable of adapting to the dynamic changes in atmospheric conditions, such as those caused by ducting. As a result, the fixed nature of these systems leads to a range of problems. For instance, when ducting occurs, signals intended for local reception can propagate much farther or miss the intended target, causing interference or reduced signal quality. This not only degrades the service quality for users in the affected area but can also lead to increased call drops, reduced data throughput, and overall network inefficiency.

The methods and systems described in the present disclosure address these challenges by introducing a dynamic optimization of antenna switching. This approach involves using a dual-antenna setup where the first antenna operates under normal conditions, and the second antenna is employed when atmospheric ducting is detected. The integration of a dynamic control unit adds an intelligent layer to the system, capable of monitoring real-time atmospheric conditions and signal quality parameters to detect the onset of ducting events.

Upon detection of such events, the system activates a switching protocol that seamlessly transfers signal transmission responsibilities from the first antenna to the second antenna. The second antenna, positioned at a different elevation, either higher or lower, is specifically adapted to mitigate the effects of ducting while maintaining the proper or desired signal coverage. It ensures that the downlink signal is transmitted effectively during these conditions, maintaining optimal signal strength and coverage. The system's ability to dynamically adjust to atmospheric conditions in real-time provides enhanced network reliability, reduced interference, and better overall service quality for users.

Accordingly, a first aspect of the present disclosure is directed to a method for dynamic optimization of antenna switching. This method includes transmitting a first downlink signal using a first antenna at a first height from a first location to a second location under standard atmospheric conditions. It also involves monitoring atmospheric conditions and downlink signal degradation. Upon determining that these conditions and degradations indicate atmospheric ducting, the method includes transmitting the downlink signal from a second antenna. This second antenna, at a different elevation, is configured for operation during the detected atmospheric ducting conditions, ensuring the continuation of efficient communication.

A second aspect of the present disclosure describes a communication system designed for dynamic optimization of antenna switching. The system comprises a first antenna positioned at a standard height for normal atmospheric conditions and a second antenna at a different height, optimized for use during atmospheric ducting events. A dynamic control unit within the system is tasked with monitoring atmospheric and signal quality parameters, detecting atmospheric ducting, and accordingly switching the downlink signal transmission from the first antenna to the second.

Another aspect of this disclosure is related to a method embodied on one or more computer-readable media, which, when executed, perform a dynamic antenna switching method. The method includes using a first antenna for standard signal transmission and a second, higher-elevation antenna for signal transmission during atmospheric ducting events. A switching protocol is activated to transfer signal transmission responsibilities between antennas upon detecting ducting conditions. This method considers multiple transmission profiles and atmospheric scenarios to dynamically optimize signal propagation within a network's coverage area.

Referring to the drawings in general, and initially to FIG. 1, an exemplary computing environment 100 suitable for practicing embodiments of the present technology is provided. Computing environment 100 is just one example, and is not intended to suggest any limitation as to the scope of use or functionality of the embodiments discussed herein. Furthermore, the computing environment 100 should not be interpreted as having any dependency or requirement relating to any one or a combination of components illustrated. It should be noted that although some components in FIG. 1 are shown in the singular, they may be plural. For example, the computing environment 100 might include multiple processors and/or multiple radios. As shown in FIG. 1, computing environment 100 includes a bus 102 that directly or indirectly couples various components together, including memory 104, processor(s) 106, presentation component(s) 108 (if applicable), radio(s) 116, input/output (I/O) port(s) 110, input/output (I/O) component(s) 112, and power supply 114. More or fewer components are possible and contemplated, including in consolidated or distributed form.

Memory 104 may take the form of memory components described herein. Thus, further elaboration will not be provided here, but it should be noted that memory 104 may include any type of tangible medium that is capable of storing information, such as a database. A database may be any collection of records, data, and/or information. In one embodiment, memory 104 may include a set of embodied computer-executable instructions that, when executed, facilitate various functions or elements disclosed herein. These embodied instructions will variously be referred to as "instructions" or an "application" for short. Processor 106 may actually be multiple processors that receive instructions and process them accordingly. Presentation component 108 may include a display, a speaker, and/or other components that may present information (e.g., a display, a screen, a lamp (LED), a graphical user interface (GUI), and/or even lighted keyboards) through visual, auditory, and/or other tactile cues.

Radio 116 may facilitate communication with a network, and may additionally or alternatively facilitate other types of wireless communications, such as Wi-Fi, WiMAX, LTE, and/or other VoIP communications. In various embodiments, the radio 116 may be configured to support multiple technologies, and/or multiple radios may be configured and utilized to support multiple technologies. The input/output (I/O) ports 110 may take a variety of forms. Exemplary I/O ports may include a USB jack, a stereo jack, an infrared port, a firewire port, other proprietary communications ports, and the like. Input/output (I/O) components 112 may comprise keyboards, microphones, speakers, touchscreens, and/or any other item usable to directly or indirectly input data into the computing environment 100. Power supply 114 may include batteries, fuel cells, and/or any other component that may act as a power source to supply power to the computing environment 100 or to other network components, including through one or more electrical connections or couplings. Power supply 114 may be configured to selectively supply power to different components independently and/or concurrently.

Figure 2:
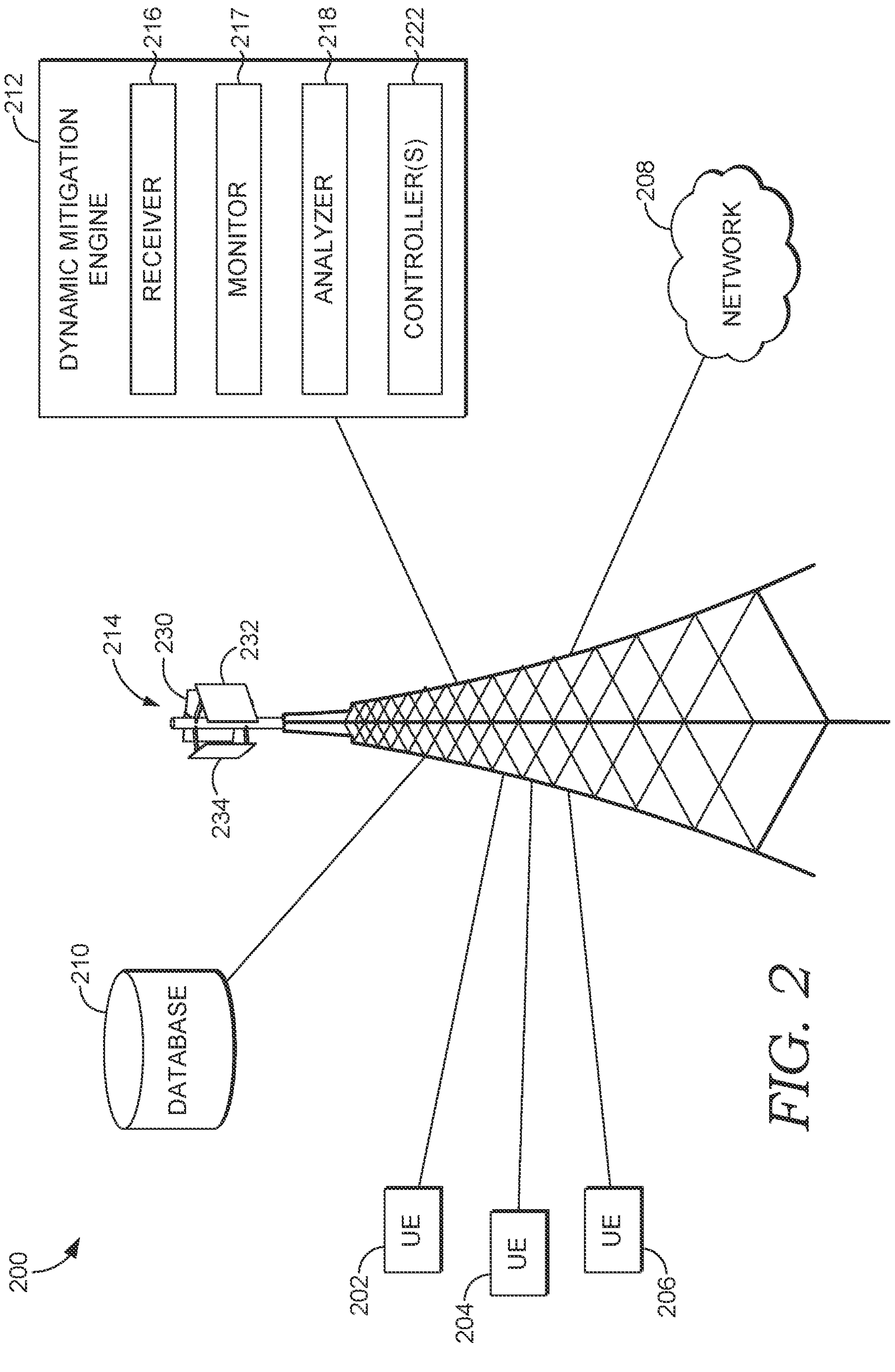
FIG. 2 illustrates a diagram of an exemplary environment in which implementations of the present disclosure may be employed.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes one or more user devices (e.g., user devices 202, 204, and 206), cell site 214, network 208, database 210, and dynamic mitigation engine 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices, or any other device that communicates via wireless communications with a cell site 214 in order to interact with a public or private network.

In some aspects, the user devices 202, 204, and 206 correspond to computing environment 100 in FIG. 1. Thus, a user device may include, for example, a display(s), a power source(s) (e.g., a battery), a data store(s), a speaker(s), memory, a buffer(s), a radio(s) and the like. In some implementations, the user devices 202, 204, and 206 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, LTE, 6G, CDMA, or any other type of network.

In some cases, the user devices 202, 204, and 206 in network environment 200 may optionally utilize network 208 to communicate with other computing devices (e.g., a mobile device(s), a server(s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) may provide connectivity in various implementations. Network 208 may include multiple networks, as well as being a network of networks, but is shown in more simple form so as to not obscure other aspects of the present disclosure.

Network 208 may be part of a telecommunication network that connects subscribers to their service provider. In aspects, the service provider may be a telecommunications service provider, an internet service provider, or any other similar service provider that provides at least one of voice telecommunications and data services to any or all of the user devices 202, 204, and 206. For example, network 208 may be associated with a telecommunications provider that provides services (e.g., LTE, 4G, 5G, 6G) to the user devices 202, 204, and 206. Additionally or alternatively, network 208 may provide voice, SMS, and/or data services to user devices or corresponding users that are registered or subscribed to utilize the services provided by a telecommunications provider. Network 208 may comprise any communication network providing voice, SMS, and/or data service(s), using any one or more communication protocols, such as a 1× circuit voice, a 3G network (e.g., CDMA, CDMA2000, WCDMA, GSM, UMTS), a 4G network (WiMAX, LTE, HSDPA), a 5G network, or a 6G network. The network 208 may also be, in whole or in part, or have characteristics of, a self-optimizing network.

Figure 3:
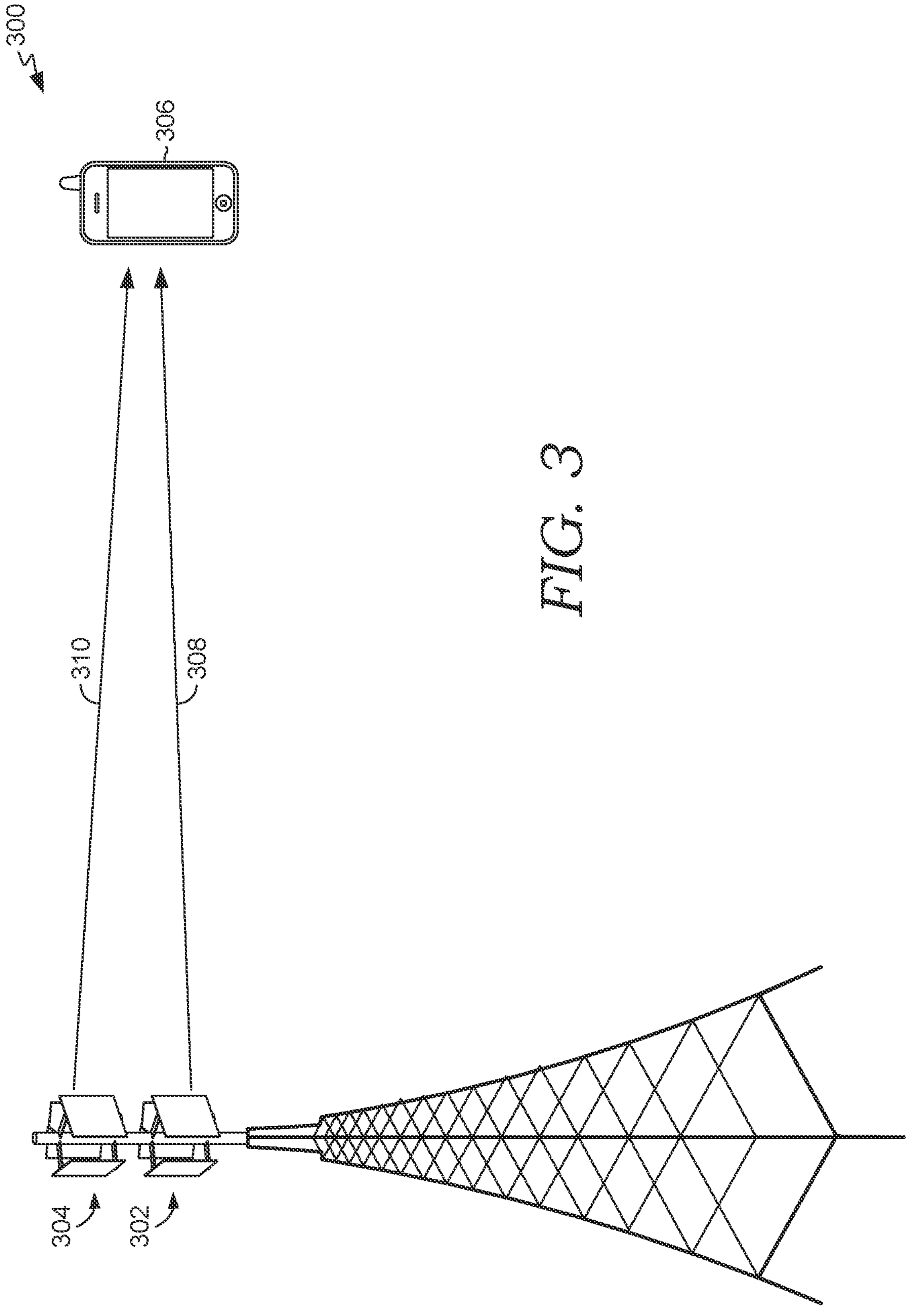
FIG. 3 illustrates exemplary environments in which implementations of the present disclosure may be employed.

In some implementations, cell site 214 is configured to communicate with the user devices 202, 204, and 206 that are located within the geographical area defined by a transmission range and/or receiving range of the radio antennas of cell site 214. The geographical area may be referred to as the “coverage area” of the cell site or simply the “cell,” as used interchangeably hereinafter. Cell site 214 may include one or more base stations, base transmitter stations, radios, antennas, antenna arrays, power amplifiers, transmitters/receivers, digital signal processors, control electronics, GPS equipment, and the like. In particular, cell site 214 may be configured to wirelessly communicate with devices within a defined and limited coverage area. In an exemplary aspect, the cell site 214 comprises a base station that serves at least one sector of the cell associated with the cell site 214, and at least one transmit antenna for propagating a signal from the base station to one or more of the user devices 202, 204, and 206. In other aspects, the cell site 214 may comprise multiple base stations and/or multiple transmit antennas for each of the one or more base stations, any one or more of which may serve at least a portion of the cell. For example, the cell site may comprise a first antenna array 230, a second antenna array 232, and a third antenna array 234, wherein each of the antenna arrays serves a distinct sector (i.e., portion) of the coverage area of the cell site 214. In an additional example, as shown in FIG. 3, the cell site 214 may have more than one antenna array at differing heights. A first antenna array may be at a first height that is optimized for normal atmospheric conditions. A second antenna array may be at a second height that is optimized for transmission during ducting conditions. In some aspects, the cell site 214 may comprise one or more macro cells (providing wireless coverage for users within a large geographic area) or it may be a small cell (providing wireless coverage for users within a small geographic area).

As shown, cell site 214 is in communication with dynamic mitigation engine 212, which comprises various components that are utilized, in various implementations, to perform one or more methods for determining an antenna switching protocol and implementing that protocol for a UE while the UE is within cell site 214's coverage area. In some implementations, dynamic mitigation engine 212 comprises components including a monitor 217, an analyzer 218, and a controller 220. However, in other implementations, more or less components than those shown in FIG. 2 may be utilized to carry out aspects of the invention described herein. The components of dynamic mitigation engine 212 may take any one or more of many forms, but specifically may comprise one or more processors and/or servers configured to perform the functions described herein.

The monitor 216 within the dynamic mitigation engine 212 is tasked with tracking signal quality for multiple UEs within the coverage area of cell site 214. Additionally, it scrutinizes atmospheric conditions, including temperature gradients and humidity levels, crucial for predicting and identifying tropospheric ducting events. This monitoring can be achieved through two methods: firstly, by analyzing weather reports to ascertain if conditions are conducive to ducting, and secondly, through weather sensors associated with cell site 214. When the monitor 216 identifies a significant rise in temperature inversion, or other indicators of ducting, the monitor 216 prompts the dynamic mitigation engine 212 to assess the impact on signal propagation. If this assessment reveals a potential degradation in signal quality, evidenced by factors like increased retransmission rates or elevated noise levels, the engine may opt to switch from the current antenna, optimized for standard conditions, to an alternative antenna optimized for ducting conditions.

The monitor 216 observes signal quality information, channel state information, and propagation characteristics, which include, among other things, channel failure rates, protocol data unit retransmission rates, voice call failure rates, and noise levels caused by interference. It assesses these parameters by analyzing data from cell site 214, various UEs, and other suitable receiver devices. This comprehensive monitoring allows the monitor 216 to effectively gauge the current state of the network and atmospheric conditions, thereby informing decisions about antenna selection.

The analyzer 218 interprets the data collected by the monitor 216 to ascertain signal quality against a dynamically adjustable, pre-determined thresholds. It processes both signal quality measurements and atmospheric data, set at specific frequencies and periods by the operator. These measurements are then evaluated against historical baselines to identify deviations that could indicate atmospheric disturbances such as ducting. If the analyzer 218 concludes that a combination of poor signal quality and specific atmospheric conditions points to atmospheric ducting, it triggers a recommendation to switch antennas to improve signal transmission.

Furthermore, the analyzer 218 dynamically adjusts the thresholds for signal quality and atmospheric conditions to enhance network performance. By analyzing various parameters such as current network conditions, user demand, and resource availability, the analyzer sets thresholds that optimize network efficiency. For example, in periods of high user demand, the analyzer might lower the threshold for switching to ensure consistent signal quality, while in more stable periods, it might raise the threshold to prevent unnecessary antenna switches.

In collaboration with the controller 220, the analyzer 218 ensures efficient execution of antenna switches. When an antenna switch is deemed necessary, the analyzer 218 signals the controller 220, which then employs pre-established protocols to execute the switch during ducting conditions. The controller 220, a crucial element of the dynamic mitigation engine 212, interprets data and directives from the analyzer 218 and implements antenna switching in real-time. It ensures a seamless transition between antennas, minimizing service disruption and maintaining continuous communication with the UE, as demonstrated in FIG. 3.

Upon receiving the signal from the analyzer 218, the controller 220 prepares the antenna optimized for ducting conditions to take over the signal transmission. This preparation includes calibrating the antenna's parameters—such as its frequency, power levels, and beam direction—to align with the current network demands and the specific atmospheric conditions detected. Concurrently, the controller 220 begins to scale down the operation of the antenna optimized for standard operating conditions, reducing its signal transmission in a controlled manner to prevent any abrupt loss of service.

As the antenna optimized for ducting conditions ramps up its operation, the controller 220 manages the signal handover. This process involves dynamically adjusting the signal strength and other transmission characteristics to ensure that the UE experiences no noticeable change in service quality. Advanced algorithms within the controller 220 manage this transition, considering factors like signal overlap, potential interference, and optimal coverage patterns to maintain a seamless user experience. Once the antenna optimized for ducting conditions fully assumes the downlink signal responsibilities, the antenna optimized for normal conditions ceases its transmission. However, the controller 220 keeps it in a standby mode, ready to be reactivated when normal atmospheric conditions return. This entire switch is executed in real-time, leveraging the controller's 220 protocols and the system's integrated hardware capabilities.

The controller 220 is also responsible for reverting the connection back to the antenna optimized for normal conditions once ducting conditions cease. It continuously monitors signal quality and atmospheric conditions, waiting for indicators that the ducting event has ended and signal quality has stabilized above the set threshold. This switch back to the antenna optimized for normal operating conditions is carefully managed to avoid premature or frequent toggling between antennas in fluctuating conditions. The controller 220 can execute this restoration either incrementally or completely, guided by real-time network metrics and performance indicators to ensure optimal network functioning.

FIG. 3 illustrates an embodiment of the present disclosure. The depiction is centered on system 300, which fundamentally comprises a first antenna 302, a second antenna 304, UE 306, first downlink signal 308 from the first antenna 302 and a second downlink signal 310 from the second antenna 304. The first antenna 302 being at a first height optimized for standard or normal operating conditions. The second antenna 304 being at a second height optimized for ducting conditions. The system 300, emblematic of a complex communication hub, hosts a dynamic mitigation engine 212 that incorporates monitor 216, analyzer 218, and controller 220, as described herein with respect to FIG. 2.

At the heart of system 300 is the first antenna 302, which operates at a standard height suitable for typical atmospheric conditions. The first antenna 302 is the primary means of downlink communication to UE 306 under normal circumstances. It is engineered to provide optimal coverage and signal strength, balancing the network's performance requirements with the physical and regulatory constraints that determine antenna placement and height. Complementing the first antenna 302 is the second antenna 304, which stands at a taller height, specifically optimized for conditions when tropospheric ducting is identified. This second antenna is designed to counteract the negative effects that occur during ducting events.

UE 306 represents the receivers in the network—smartphones, tablets, other mobile devices, or other cell sites—that rely on consistent and high-quality signal reception for communication. The performance of UE 306 is directly impacted by the quality of the downlink signals it receives, which are susceptible to the fluctuations in atmospheric conditions, making the role of system 300 crucial for maintaining service reliability.

The first downlink signal 308, emanating from the first antenna 302, is the typical signal path used during standard operation. This signal is tailored to the common propagation environment and is calibrated for maximum efficiency under ordinary weather patterns and atmospheric conditions.

Conversely, the second downlink signal 310 originates from the second antenna 304 and is deployed when the monitor within system 300 detects atmospheric conditions that lead to ducting. The height advantage of the second antenna 304 ensures that the signal can penetrate the ducting layer more effectively, delivering a clearer, stronger signal to UE 306.

The dynamic mitigation engine of system 300 is a central feature that integrates the monitor 216, analyzer 218, and controller 220. The monitor 216 continuously assesses atmospheric data and signal quality metrics to detect any onset of ducting conditions that could affect signal propagation. Once ducting conditions are detected by monitor 216, the analyzer 218 processes this information, along with real-time signal quality information, to make an informed decision on whether to maintain transmission through the first antenna 302 or to switch to the second antenna 304. This decision is based on pre-determined thresholds and historical data patterns, ensuring that the switch is made only when it will result in a net positive outcome for network performance.

Finally, the controller 220 is tasked with executing the decision made by the analyzer 218. It activates the switching mechanism that transitions the downlink signal from the first antenna 302 to the second antenna 304, thus ensuring that UE 306 receives the best possible signal. The controller 220 also oversees the reversion of the system back to the first antenna 302 once the ducting event has passed and normal propagation conditions are restored, maintaining the seamless delivery of communication services.

Figure 4:
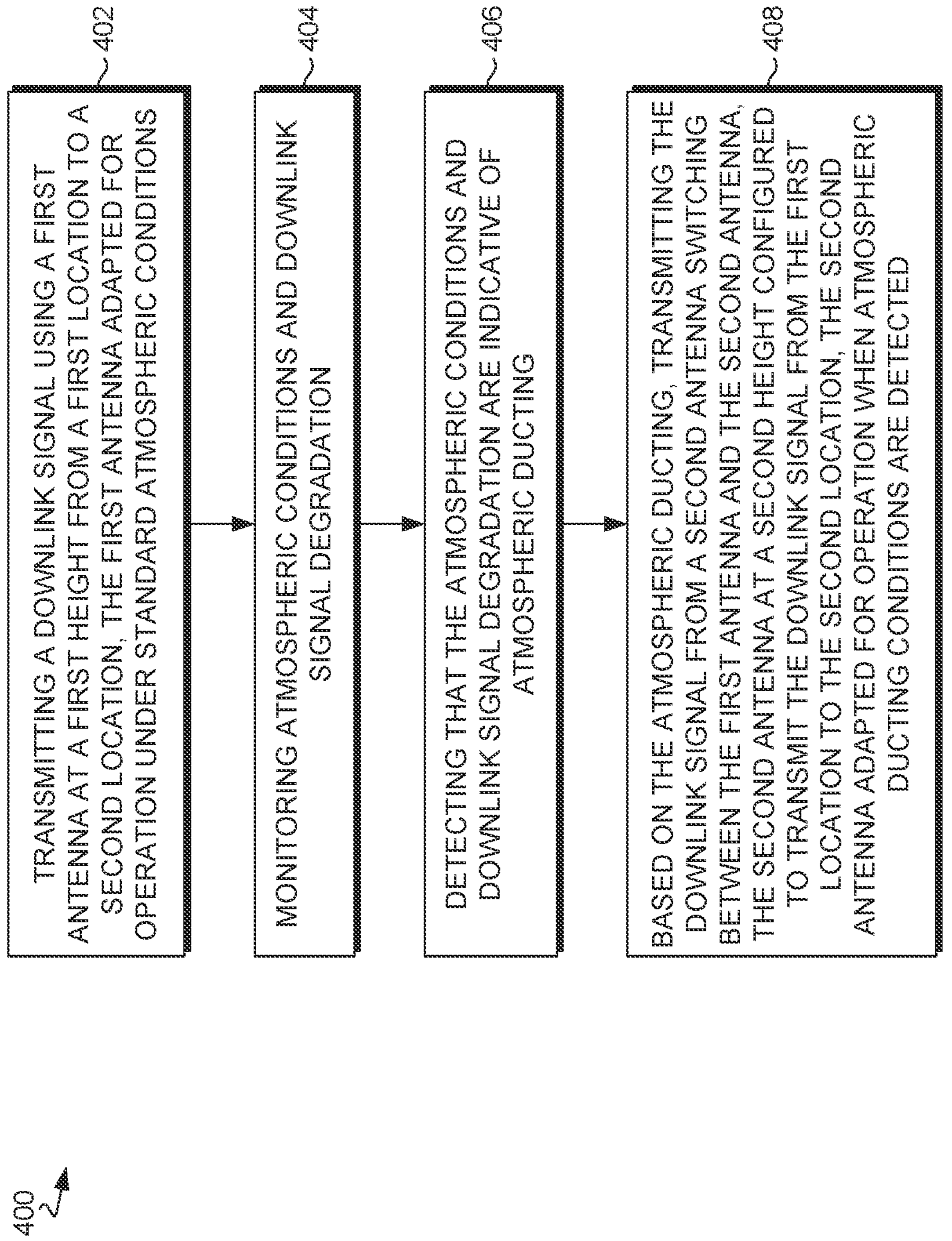
FIG. 4 depicts a flow diagram of an exemplary method for optimizing antenna switching, in accordance with embodiments described herein.

Turning now to FIG. 4, a flow chart representing a method 400 is provided. FIG. 4 presents a detailed flowchart representing the sequence of operations undertaken by the innovative system. Initially, at block 402, the system transmits a downlink signal using a first antenna at a first height from a first location to a second location. This first antenna is specifically adapted for standard atmospheric conditions. It is the default transmission source under normal weather patterns and is tuned to provide optimal signal strength and coverage for everyday use.

The system, at block 404, then engages in monitoring atmospheric conditions and downlink signal degradation. This step involves continuous or periodic assessment of the atmosphere for signs of temperature inversions or humidity levels that could indicate the onset of ducting conditions. Simultaneously, the system evaluates the integrity of the downlink signal to detect any degradation that might suggest adverse propagation phenomena are at play.

Next at block 406, the system detects that the atmospheric conditions and downlink signal degradation are indicative of atmospheric ducting. This detection is based on predefined criteria and thresholds, which, when met or exceeded, signal the presence of ducting conditions that are potentially causing interference. This detection is done based on predefined atmospheric thresholds. Based on the identification of atmospheric ducting, the method progresses, at block 408, to transmitting the downlink signal using a second antenna. This entails switching the downlink signal transmission from the first antenna to the second antenna. The second antenna is situated at a different height compared to the first, and it is configured to transmit the downlink signal effectively during detected ducting conditions. The position of the second antenna helps mitigate the issues caused by ducting ensuring that the downlink signal is delivered accurately to the intended second location.

FIG. 4's depiction of the method 400 integrates an advanced atmospheric monitoring system that collects data on temperature, humidity, and barometric pressure, which are indicators of potential atmospheric ducting conditions. Furthermore, the system meticulously can track downlink signal quality by monitoring the bit error rate (BER) and packet loss, providing a detailed understanding of signal integrity and the need for any corrective measures, such as adjusting the transmission frequency to minimize interference when ducting is detected.

The second antenna, equipped with a tunable feature, allows for a flexible adjustment of its operational frequency, enhancing its ability to maintain signal clarity during atmospheric anomalies. Additionally, predictive algorithms are employed to forecast ducting events, enabling proactive adjustments to the antenna selection before signal degradation occurs. The method also includes a communication protocol with the network management system, ensuring that every switch between the first and second antennas is logged and managed centrally, facilitating a coordinated network response to atmospheric variations.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A method for dynamic optimization of antenna transmission profile switching, the method comprising:

transmitting a first downlink signal using a first antenna at a first height from a first location to a second location, the first antenna adapted for operation under standard atmospheric conditions;

monitoring atmospheric conditions and downlink signal degradation;

determining that the atmospheric conditions and downlink signal degradation are an indication of atmospheric ducting; and based on the determination of the indication of the atmospheric ducting, transmitting the downlink signal from a second antenna, the second antenna at a second height configured to transmit a second downlink signal from the first location to the second location, the second antenna adapted for operation when atmospheric ducting conditions are detected.

2. The method of claim 1, wherein the monitoring of atmospheric conditions includes receiving information related to temperature, humidity, and barometric pressure.

3. The method of claim 1, wherein the monitoring of downlink signal degradation includes monitoring a bit error rate (BER) and packet loss to determine the quality of the downlink signal.

4. The method of claim 1, further comprising adjusting a transmission frequency of the downlink signal based on the detection of atmospheric ducting to minimize interference.

5. The method of claim 1, wherein the second antenna comprises a tunable feature allowing an operation frequency of the second antenna to be adjusted.

6. The method of claim 1, further comprising using a predictive algorithm to anticipate an occurrence of atmospheric ducting based on the monitored atmospheric conditions.

7. The method of claim 1, further comprising notifying a network management system of the switch between the first antenna and the second antenna.

8. The method of claim 1, further comprising dynamically adjusting a power output of the second antenna to maintain a stable downlink signal to the second location during the atmospheric ducting conditions.

9. A system for dynamic optimization of antenna transmission profile switching, the system comprising:

a first antenna positioned at a first height and adapted for transmitting a downlink signal to a user equipment under standard atmospheric conditions;

a second antenna positioned at a second, taller height and adapted for use during detected atmospheric ducting conditions to transmit the downlink signal;

a processor configured to:

monitor atmospheric conditions and signal quality parameters, detect atmospheric ducting based on the monitored conditions and parameters, and switch downlink signal transmission from the first antenna to the second antenna upon detection of ducting conditions.

10. The system of claim 9, wherein the processor is further configured to revert transmission back to the first antenna when atmospheric ducting conditions are no longer detected.

11. The system of claim 9, wherein the first antenna and the second antenna are co-located at the same cell site.

12. The system of claim 9, wherein the second antenna is automatically selected based on a threshold level of signal degradation.

13. The system of claim 9, wherein the processor is further configured to adjust a transmission power when switching between antennas.

14. The system of claim 9, further including an alert mechanism that notifies network operators upon switching of antennas due to ducting conditions.

15. The system of claim 9, wherein the processor includes a predictive model to forecast atmospheric ducting based on historical weather data.

16. One or more non-transitory computer-readable media having computer-executable instructions embodied thereon that, when executed, perform a method for dynamic antenna switching, the method comprising:

using a first antenna at a first elevation for standard signal transmission to a user equipment;

using a second antenna at a higher elevation signal transmission during atmospheric ducting events;

activating a switching protocol to transfer signal transmission responsibilities from the first antenna to the second antenna upon detecting conditions indicative of atmospheric ducting; and employing a control unit configured to assess signal quality metrics and atmospheric data to determine a timing for activating the switching protocol.

17. The one or more non-transitory computer-readable media of claim 16, wherein the control unit is further configured to revert the signal transmission responsibilities back to the first antenna when the atmospheric ducting conditions are no longer detected, as determined by a set of predefined atmospheric thresholds.

18. The one or more non-transitory computer-readable media of claim 16, comprising using predictive analytics to preemptively adjust the switching protocol based on forecasted weather patterns associated with atmospheric ducting.

19. The one or more non-transitory computer-readable media of claim 16, further comprising coordinating with neighboring cell sites to manage network load and minimize the potential for signal interference during the activation of the switching protocol.

* * * * *